US009698837B2

(12) United States Patent
Gori (10) Patent No.: US 9,698,837 B2
(45) Date of Patent: Jul. 4, 2017

(54) COMMUNICATION DEVICE AND METHOD FOR PROCESSING A RECEIVED SIGNAL (71) Applicant: Intel Corporation, Santa Clara, CA (US)

(72) Inventor: Silvano Gori, Munich (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/844,044

(22) Filed: Sep. 3, 2015

(65) Prior Publication Data

US 2016/0112080 A1 Apr. 21, 2016

(30) Foreign Application Priority Data

Oct. 17, 2014 (DE) .......................... 10 2014 115 136

(51) Int. Cl.
*H04B 17/00* (2015.01)
*H04B 1/10* (2006.01)
(Continued)

(52) U.S. Cl.
CPC ......... *H04B 1/1027* (2013.01); *H04B 17/309* (2015.01); *H04B 17/345* (2015.01); *H04B 17/3912* (2015.01)

(58) Field of Classification Search
CPC ............................ H04B 1/1027; H04B 17/336
See application file for complete search history.

(56) References Cited

U.S. PATENT DOCUMENTS 6,304,618 B1 * 10/2001 Hafeez ................ H04L 25/0204
375/262
7,778,309 B2 * 8/2010 Jung .................... H04B 7/0845
370/252

(Continued)

FOREIGN PATENT DOCUMENTS

DE     102014115136 A1    4/2016
GB       2511865 A      9/2014

(Continued)

OTHER PUBLICATIONS

Office action received for German Patent Application No. 10 2014 115 136.4 mailed on Jun. 29, 2015, 11 pages of office action and 7 pages of English translation.

(Continued)

*Primary Examiner* — Dac Ha
(74) *Attorney, Agent, or Firm* — Viering, Jentschura & Partner mbB (57) ABSTRACT

A communication device is provided comprising a frontend component configured to receive a signal being a combination of an information signal and an interference signal; a first interference removal component configured to reconstruct the interference signal and to subtract the reconstructed interference signal from the received signal to generate a first processed received signal; a second interference removal component configured to equalize the received signal based on channel information of a channel between the device and a sender of the information signal and channel information of a channel between the device and a sender of the interference signal to generate a second processed received signal; and a processor configured to reproduce information contained in the information signal based on the one of the processed received signals or a combination of the processed received signals based a comparison of (Continued)

the first processed received signal and the second processed received signal.

20 Claims, 8 Drawing Sheets

(51) Int. Cl.
*H04B 17/309* (2015.01)
*H04B 17/345* (2015.01)
*H04B 17/391* (2015.01)

(56) References Cited

U.S. PATENT DOCUMENTS

| | | | |
|---|---|---|---|
| 8,085,840 B2 | 12/2011 | Saints et al. | |
| 8,254,510 B2 | 8/2012 | Liu et al. | |
| 2008/0019434 A1 | 1/2008 | Kim et al. | |
| 2009/0252237 A1 | 10/2009 | Ma et al. | |
| 2010/0323713 A1 | 12/2010 | Liu | |
| 2011/0051864 A1* | 3/2011 | Chalia | H04L 25/0328 375/346 |
| 2011/0150153 A1 | 6/2011 | Liu et al. | |
| 2012/0093272 A1* | 4/2012 | Kimata | H04L 25/022 375/348 |
| 2012/0121002 A1* | 5/2012 | Liu | H04L 1/0631 375/227 |
| 2014/0233626 A1 | 8/2014 | Kim et al. | |
| 2014/0301268 A1 | 10/2014 | Xu et al. | |
| 2014/0301498 A1 | 10/2014 | Rimini et al. | |
| 2015/0003509 A1* | 1/2015 | Faber | H04L 27/01 375/232 |

FOREIGN PATENT DOCUMENTS

| | | |
|---|---|---|
| TW | 201128971 A | 8/2011 |
| WO | 2009/082084 A1 | 7/2009 |
| WO | 2014166061 A1 | 10/2014 |

OTHER PUBLICATIONS

"Universal Mobile Telecommunications System (UMTS); Feasibility study on interference cancellation for UTRA FDD User Equipment (UE) (3GPP TR 25.963 version 10.0.0 Release 10)", 3GPP, May 2011, France.

Office Action received for corresponding TW Application No. 104129958 dated Sep. 12, 2016, 7 pages, including its English Translation of 3 pages.

* cited by examiner

FIG 8

COMMUNICATION DEVICE AND METHOD FOR PROCESSING A RECEIVED SIGNAL

CROSS-REFERENCE TO RELATED APPLICATION

This application claims priority to German Patent Application Serial No. 10 2014 115 136.4, which was filed Oct. 17, 2014, and is incorporated herein by reference in its entirety.

TECHNICAL FIELD

Embodiments described herein generally relate to communication devices and a method for processing a received signal.

BACKGROUND

Wireless communication is typically affected by interference. For example, a communication terminal located at the edge of a radio cell may suffer from interference of a neighboring radio cell, i.e. an information signal transmitted by its serving base station may be disturbed by a signal transmitted by a base station operating the neighboring radio cell. It is thus desirable to be able to efficiently and reliably receive information signals (i.e. to reproduce transmitted information) affected by interference.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
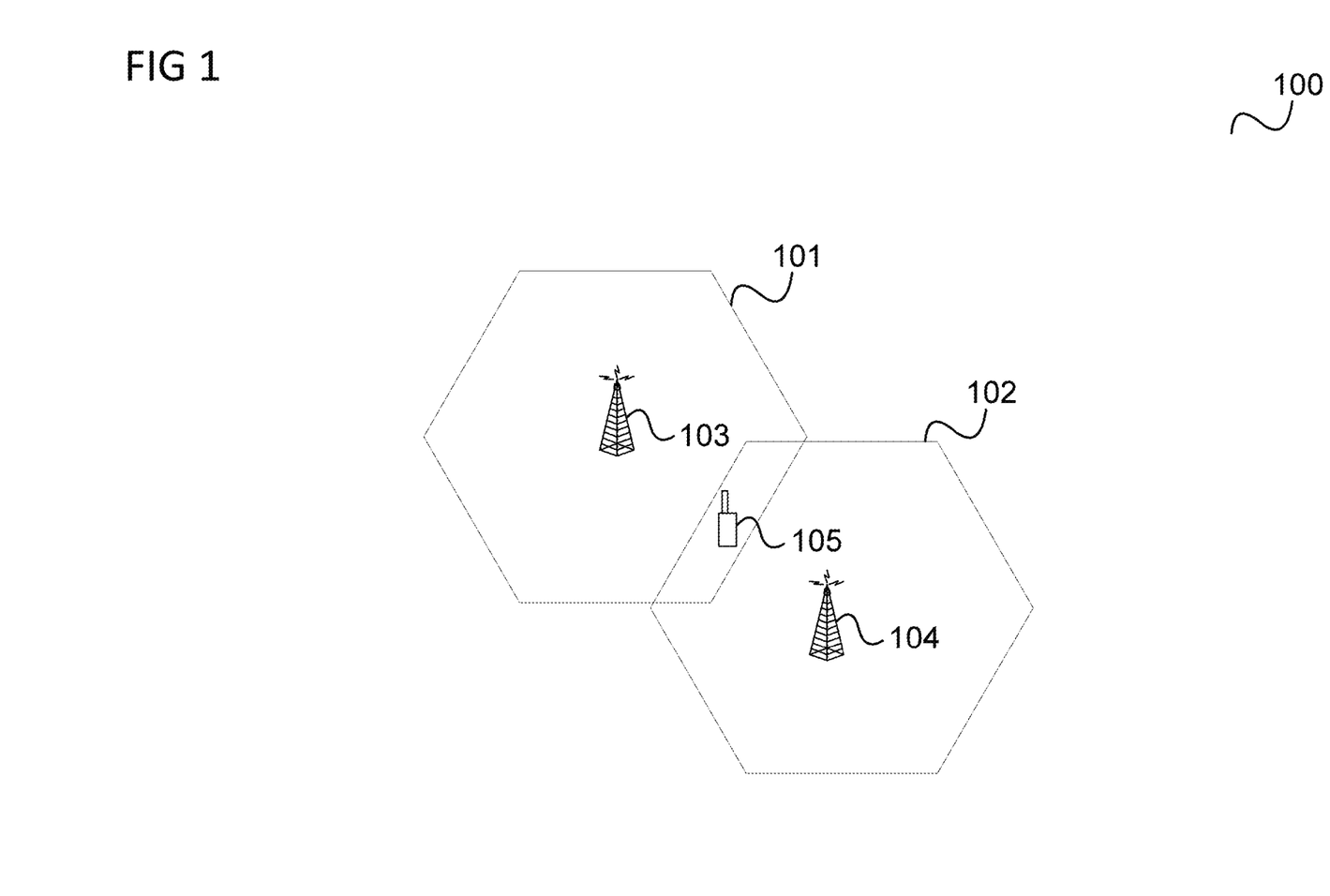
FIG. 1 shows a communication arrangement.

FIG. 1 shows a communication arrangement 100.

The communication arrangement 100 includes a first radio cell 101 and a second radio cell 102. The first radio cell 101 is operated by a first base station 103 and the second radio cell 102 is operated by a second base station 104. The base stations 103, 104 are for example part of the same mobile communication network but may also be part of different mobile communication networks e.g. according to GSM (Global System for Mobile Communications), UMTS (Universal Mobile Telecommunications System), CDMA2000 (CDMA: Code Division Multiple Access) communication system, FOMA (Freedom of Mobile Access) communication system or also LTE (Long Term Evolution).

Typically, neighboring radio cells like the first radio cell 101 and the second radio cell 102 overlap in the sense that a mobile terminal 105 located at the edge of the first radio cell 101 in an overlap area of the first radio cell 101 and the second radio cell 102 receives signals from both the first base station 103 and the second base station 104. This may mean that, for example, the first radio cell 101 is serving the mobile terminal 105 and provides a communication connection for the mobile terminal 105 and sends signals in context of the communication connection to the mobile terminal 105 but the mobile terminal also receives signals transmitted from the second base station 104 interfering with the (desired) signals transmitted by the first base station 103 and reducing the data throughput of the communication connection.

In cellular communication networks, such as those based on WCDMA (Wideband Code Division Multiple Access), the data throughput at a cell edge is typically limited by interference from neighboring cells. Reducing or even eliminating this interference can improve the signal-to-noise ratio (SNR) at the receiver (the mobile terminal 105 in the above example) and consequently increase the data throughput.

The interference of a neighboring cell included in a received signal may be addressed by means of equalization, e.g. Type 3i equalization, whereby the interference energy in the received signal is to some extent suppressed (or mitigated) by exploiting its deterministic structure in the computation of the coefficients of a linear equalizer. Such an approach is in the following referred to as an interference suppression (IS) technique. Another approach is based on reconstructing a replica of the interfering signal and subsequently subtracting it from the received signal. Such a method is in the following referred to as an interference cancellation technique (IC).

In the following, approaches are described in which these two techniques can be seen to be combined.

Figure 2:
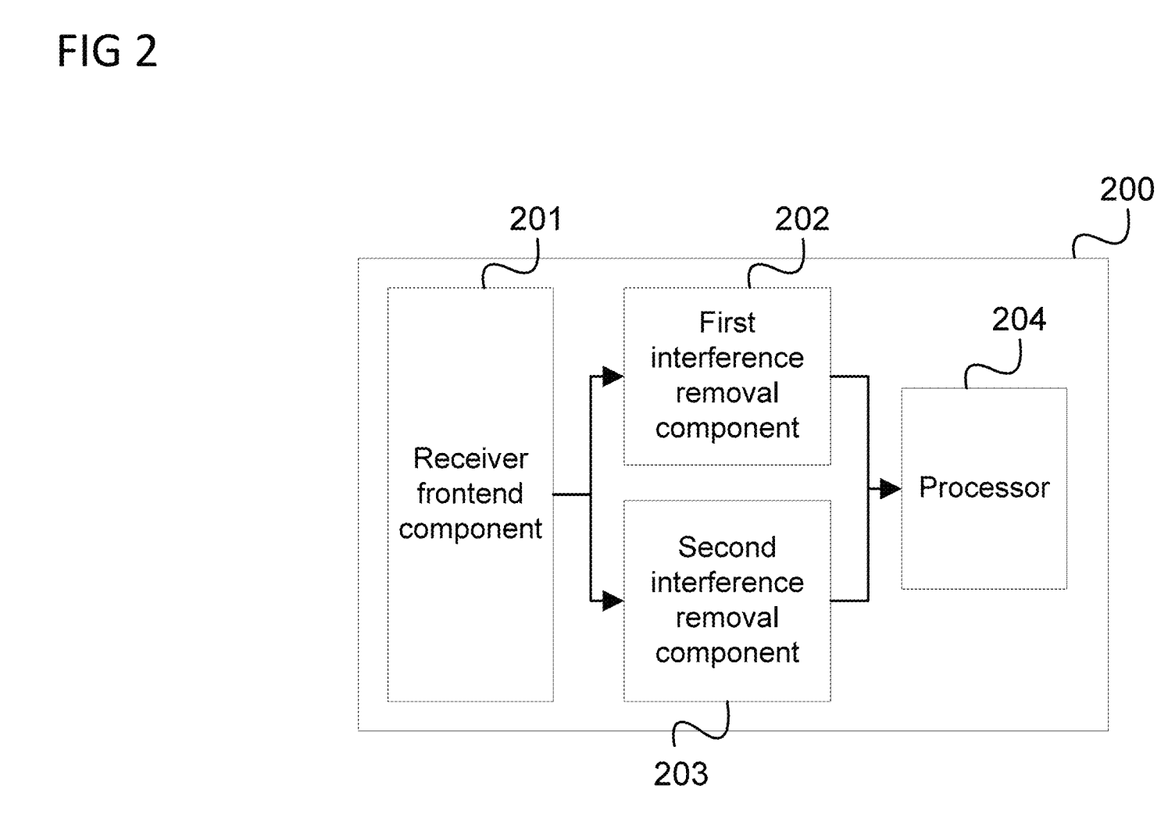
FIG. 2 shows a communication device.

FIG. 2 shows a communication device 200.

The communication device 200 includes a receiver frontend component 201 configured to receive a signal, wherein the received signal includes a combination of an information signal and an interference signal (e.g. is the combination of the information signal and the interference signal plus one or more additional components such as one or more noise signals or one or more further interference signals).

The communication device 200 further includes a first interference removal component 202 configured to reconstruct the interference signal and to subtract the reconstructed interference signal from the received signal to generate a first processed received signal and a second interference removal component 203 configured to equalize the received signal based on channel information of a communication channel between the communication device and a sender of the information signal and channel information of a communication channel between the communication device and a sender of the interference signal to generate a second processed received signal.

Further, the communication device includes a processor 204 configured to reproduce information contained in the information signal based on the first processed received signal, the second processed received signal or a combination of the first processed received signal and the second processed received signal based on a comparison of the first processed received signal and the second processed received signal.

In other words, for example, a communication device processes a received signal according to two different interference removal schemes (i.e. an interference cancellation and an interference suppression technique) and selects one of the results or uses a combination of the results for the data reconstruction. The communication device may be a communication terminal, e.g. a subscriber terminal of a cellular communication network, but may also be a network component, e.g. a base station. In the latter case, the sender of the interference signal is for example another communication terminal, e.g. operating in the same radio cell or in a neighboring radio cell.

Figure 3:
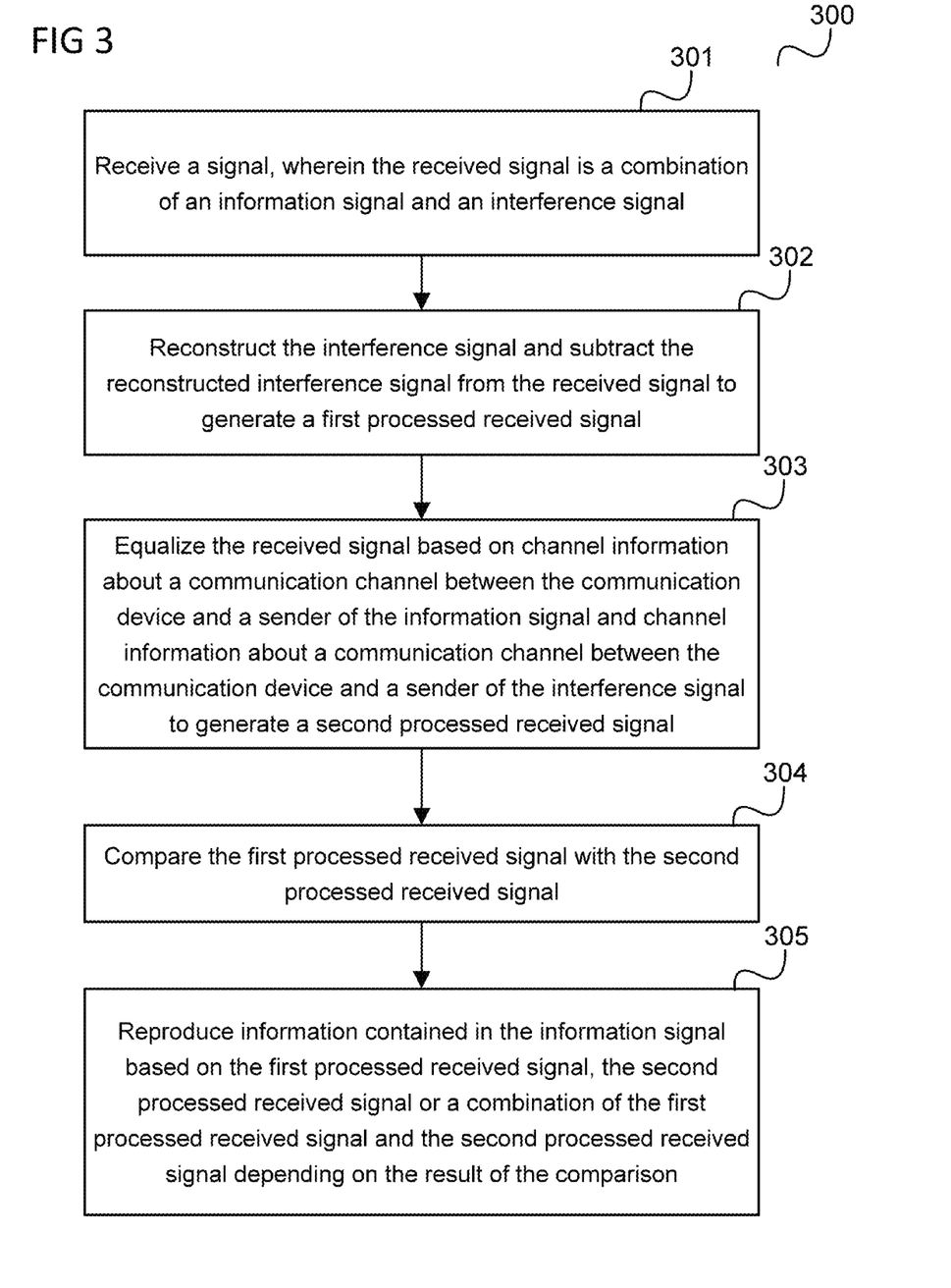
FIG. 3 shows a flow diagram illustrating a method for reconstructing an information signal, for example, carried out by a communication device.

The communication device 200 for example carries out a method as illustrated in FIG. 3.

FIG. 3 shows a flow diagram 300 illustrating a method for reconstructing an information signal, for example carried out by a communication device.

In 301, the communication device receives a signal, wherein the received signal is a combination of an information signal and an interference signal.

In 302, the communication device reconstructs the interference signal and subtracts the reconstructed interference signal from the received signal to generate a first processed received signal.

In 303, the communication device equalizes the received signal based on channel information of a communication channel between the communication device and a sender of the information signal and channel information of a communication channel between the communication device and a sender of the interference signal to generate a second processed received signal.

In 304, the communication device compares the first processed received signal with the second processed received signal.

In 305, the communication device reproduces information contained in the information signal based on the first processed received signal, the second processed received signal or a combination of the first processed received signal and the second processed received signal based on the result of the comparison.

It should be noted that 302 and 303 may be carried out in any order as well as simultaneously.

The following examples pertain to further embodiments.

Example 1 is a communication device as illustrated in FIG. 2

In Example 2, the subject matter of example 1 may optionally include the processor being configured to compare the first processed received signal with the second processed received signal by comparing a signal quality of the first processed received signal with a signal quality of the second processed received signal.

In Example 3, the subject matter of example 2 may optionally include the signal quality being a signal to noise ration or a signal to interference and noise ratio.

In Example 4, the subject matter of any one of examples 1-3 may optionally include a quality determiner configured to determine the signal quality of the first processed received signal and the signal quality of the second processed received signal.

In Example 5, the subject matter of any one of examples 1-4 may optionally include the combination being a weighted sum of the first processed received signal and the second processed received signal.

In Example 6, the subject matter of example 5 may optionally include the processor being configured to determine the weights for the weighted sum based on a signal quality of the first processed received signal and a signal quality of the second processed received signal.

In Example 7, the subject matter of any one of examples 5-6 may optionally include the processor being configured to weight the processed received signal of the first processed received signal and the second processed received signal stronger in the weighted sum having the higher signal quality.

In Example 8, the subject matter of any one of examples 5-7 may optionally include the processor being configured to determine the weight for the first processed received signal based on a relative signal quality of the first processed received signal and to determine the weight for the second processed received signal based on a relative signal quality of the second processed received signal.

In Example 9, the subject matter of any one of examples 1-8 may optionally include the first interference removal component being configured to generate the first processed received signal by non-linear processing of the received signal.

In Example 10, the subject matter of any one of examples 1-9 may optionally include the second interference removal component being configured to generate the second processed received signal by linear processing of the received signal.

In Example 11, the subject matter of any one of examples 1-10 may optionally include the second interference removal component being configured to equalize the received signal to generate the second processed received signal according to a filter based on a minimum mean squared error minimization.

In Example 12, the subject matter of any one of examples 1-11 may optionally include the communication device being a subscriber terminal of a cellular communication network and the sender of the information signal being a base station operating a serving cell of the subscriber terminal and the sender of the interference signal being a base station operating a neighboring cell of the serving cell.

Example 13 is a method for processing a received signal as illustrated in FIG. 3.

In Example 14, the subject matter of example 13 may optionally include comparing the first processed received signal with the second processed received signal by comparing a signal quality of the first processed received signal with a signal quality of the second processed received signal.

In Example 15, the subject matter of example 14 may optionally include the signal quality being a signal to noise ratio or a signal to interference and noise ratio.

In Example 16, the subject matter of any one of examples 13-15 may optionally include determining the signal quality of the first processed received signal and the signal quality of the second processed received signal.

In Example 17, the subject matter of any one of examples 13-16 may optionally include the combination being a weighted sum of the first processed received signal and the second processed received signal.

In Example 18, the subject matter of example 17 may optionally include determining the weights for the weighted sum based on a signal quality of the first processed received signal and a signal quality of the second processed received signal.

In Example 19, the subject matter of any one of examples 17-18 may optionally include weighting the processed received signal of the first processed received signal and the second processed received signal stronger in the weighted sum having the higher signal quality.

In Example 20, the subject matter of any one of examples 17-19 may optionally include determining the weight for the first processed received signal based on a relative signal quality of the first processed received signal and determining the weight for the second processed received signal based on a relative signal quality of the second processed received signal.

In Example 21, the subject matter of any one of examples 13-20 may optionally include generating the first processed received signal by non-linear processing of the received signal.

In Example 22, the subject matter of any one of examples 13-21 may optionally include generating the second processed received signal by linear processing of the received signal.

In Example 23, the subject matter of any one of examples 13-22 may optionally include equalizing the received signal to generate the second processed received signal according to a filter based on a minimum mean squared error minimization.

In Example 24, the subject matter of any one of examples 13-23 may optionally include the communication device being a subscriber terminal of a cellular communication network and the sender of the information signal being a base station operating a serving cell of the subscriber terminal and the sender of the interference signal being a base station operating a neighboring cell of the serving cell.

Example 25 is a computer readable medium having recorded instructions thereon which, when executed by a processor, make the processor perform a method for performing radio communication according to any one of examples 13-24.

Example 26 is a communication device comprising a receiving means for receiving a signal wherein the received signal comprises a combination of an information signal and an interference signal; a first interference removing means for reconstructing the interference signal and for subtracting the reconstructed interference signal from the received signal to generate a first processed received signal; a second interference removing means for equalizing the received signal based on channel information of a communication channel between the communication device and a sender of the information signal and channel information of a communication channel between the communication device and a sender of the interference signal to generate a second processed received signal and a processing means for reproducing information contained in the information signal based on the first processed received signal, the second processed received signal or a combination of the first processed received signal and the second processed received signal based a comparison of the first processed received signal and the second processed received signal.

In Example 27, the subject matter of example 26 may optionally include the processing means being for comparing the first processed received signal with the second processed received signal by comparing a signal quality of the first processed received signal with a signal quality of the second processed received signal.

In Example 28, the subject matter of example 27 may optionally include the signal quality being a signal to noise ration or a signal to interference and noise ratio.

In Example 29, the subject matter of any one of examples 26-28 may optionally include a quality determining means for determining the signal quality of the first processed received signal and the signal quality of the second processed received signal.

In Example 30, the subject matter of any one of examples 26-29 may optionally include the combination being a weighted sum of the first processed received signal and the second processed received signal.

In Example 31, the subject matter of example 30 may optionally include the processing means being for determining the weights for the weighted sum based on a signal quality of the first processed received signal and a signal quality of the second processed received signal.

In Example 32, the subject matter of any one of Examples 30-31 may optionally include the processing means being for weighting the processed received signal of the first processed received signal and the second processed received signal stronger in the weighted sum having the higher signal quality.

In Example 33, the subject matter of any one of examples 30-32 may optionally include the processing means being for determining the weight for the first processed received signal based on a relative signal quality of the first processed received signal and for determining the weight for the second processed received signal based on a relative signal quality of the second processed received signal.

In Example 34, the subject matter of any one of examples 26-33 may optionally include the first interference removing means being for generating the first processed received signal by non-linear processing of the received signal.

In Example 35, the subject matter of any one of examples 26-34 may optionally include the second interference removing means being for generating the second processed received signal by linear processing of the received signal.

In Example 36, the subject matter of any one of examples 26-35 may optionally include the second interference removing means being for equalizing the received signal to generate the second processed received signal according to a filter based on a minimum mean squared error minimization.

In Example 37, the subject matter of any one of examples 26-36 may optionally include the communication device being a subscriber terminal of a cellular communication network and the sender of the information signal being a base station operating a serving cell of the subscriber terminal and the sender of the interference signal being a base station operating a neighboring cell of the serving cell.

It should be noted that one or more of the features of any of the examples above may be combined with any one of the other examples.

In the following, examples are described in more detail. In the following examples, a communication device is provided in which the two interference removal techniques cancellation (IC) and interference suppression (IS) co-exist. This may be beneficial since, in some use cases, IS offers superior performance compared to IC, whereas in other use cases the opposite applies. For example, a decision logic is implemented in the communication device to dynamically select the interference handling method (i.e. the interference removal technique) that is most appropriate for the current operating point of the communication device with the goal of achieving in all working conditions the highest of the data throughputs offered by the IS and IC methods alone. This approach is illustrated in FIG. 4.

Figure 4:
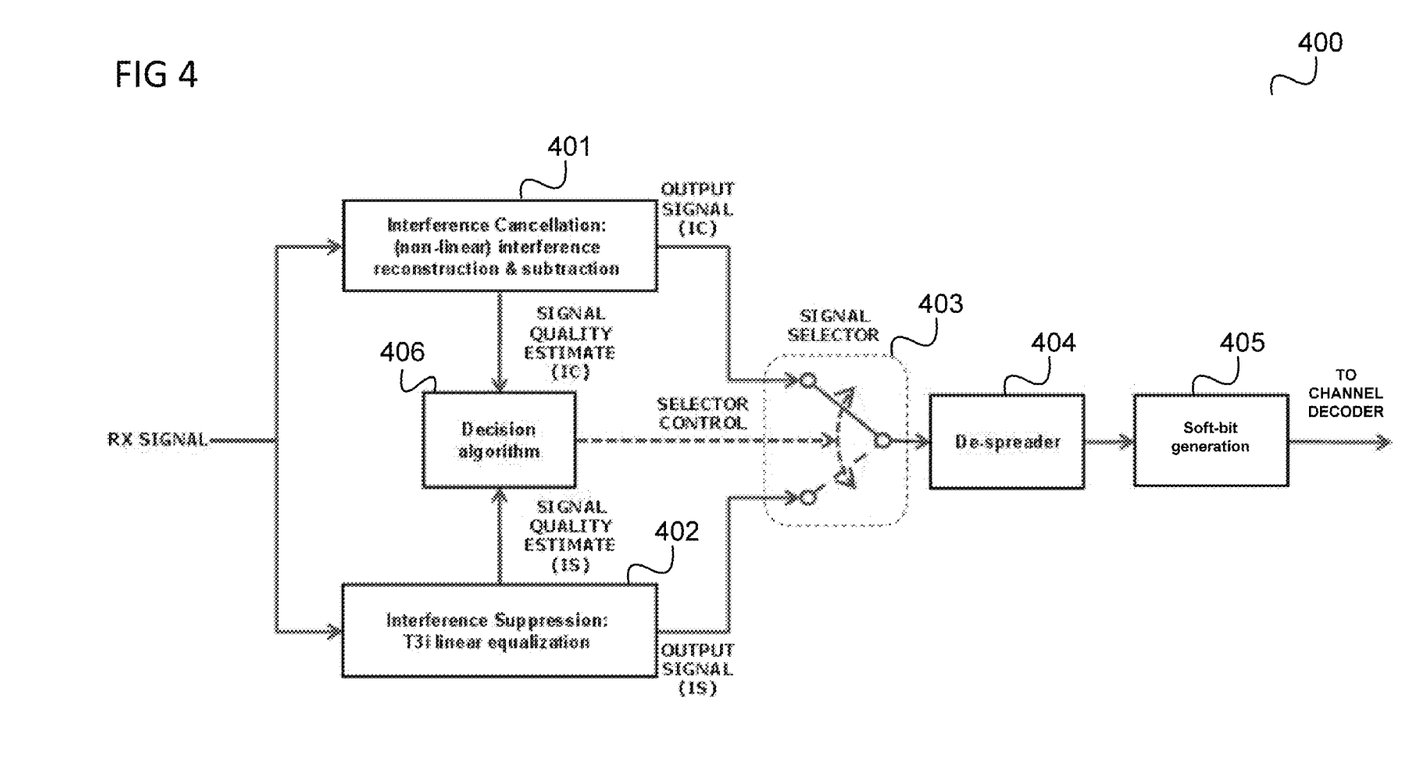
FIG. 4 shows a receiver architecture of a communication device including a selection of an interference cancellation result or an interference suppression result for data reconstruction.

FIG. 4 shows a receiver architecture of a communication device including a selection of an interference cancellation result or an interference suppression result for data reconstruction.

In this example, a received baseband signal (RX signal), e.g. received by a receiver frontend of the communication device, i.e. generated by the receiver frontend from a received radio frequency (RF) signal, is fed to an interference cancellation block 401 as well as an interference suppression block 402. The received signal processed by interference cancellation and the received signal processed by interference suppression are both fed to a signal selector 403 which selects one of the processed signals for data reconstruction, i.e. selects one of the processed signals to be fed to data reproduction components. For example, if the communication device is based on WCDMA radio technology, the data reproduction components can be a de-spreader 404, a soft-bit generator 405 and a channel decoder (not shown).

The selection by the selector 403 is controlled by a decision algorithm 406 which receives a quality estimate of the received signal processed by interference cancellation and a quality estimate of the received signal processed by interference suppression and for example controls the selector 403 to select the processed signal with the higher quality. By way of example, the quality estimate could be the SINR (signal to interference and noise ratio) measured on a pilot signal included in the received signal.

In other words, a received baseband signal is fed to the input of two parallel and synchronous signal processing paths (i.e. which run synchronously and in parallel), one performing IS, the other IC. The corresponding output signals are connected to a signal selector before entering the reconstruction, e.g. de-modulation, stage (including for example de-spreading, soft-bit generation and channel decoding). By periodically determining and comparing signal quality estimates obtained from the two signal processing paths, a decision algorithm switches the path with the highest quality metric to the input of the reconstruction components (e.g. the input of a de-modulator): this signal is also expected to yield improved reliability of the soft-bits and consequently higher data throughput. The signal quality metric could be, for example, represented by the signal-to-interference-and-noise ratio (SINR) measured on the pilot signal at the output of each signal processing path. The quality measurements and selection decisions are for example taken on a periodical basis according to a frame structure of the corresponding radio technology. For example, if the communication device is based on the UMTS standard, the quality measurements and selection decisions could be taken every half-slot, i.e. every 333 micro-seconds.

Figure 5:
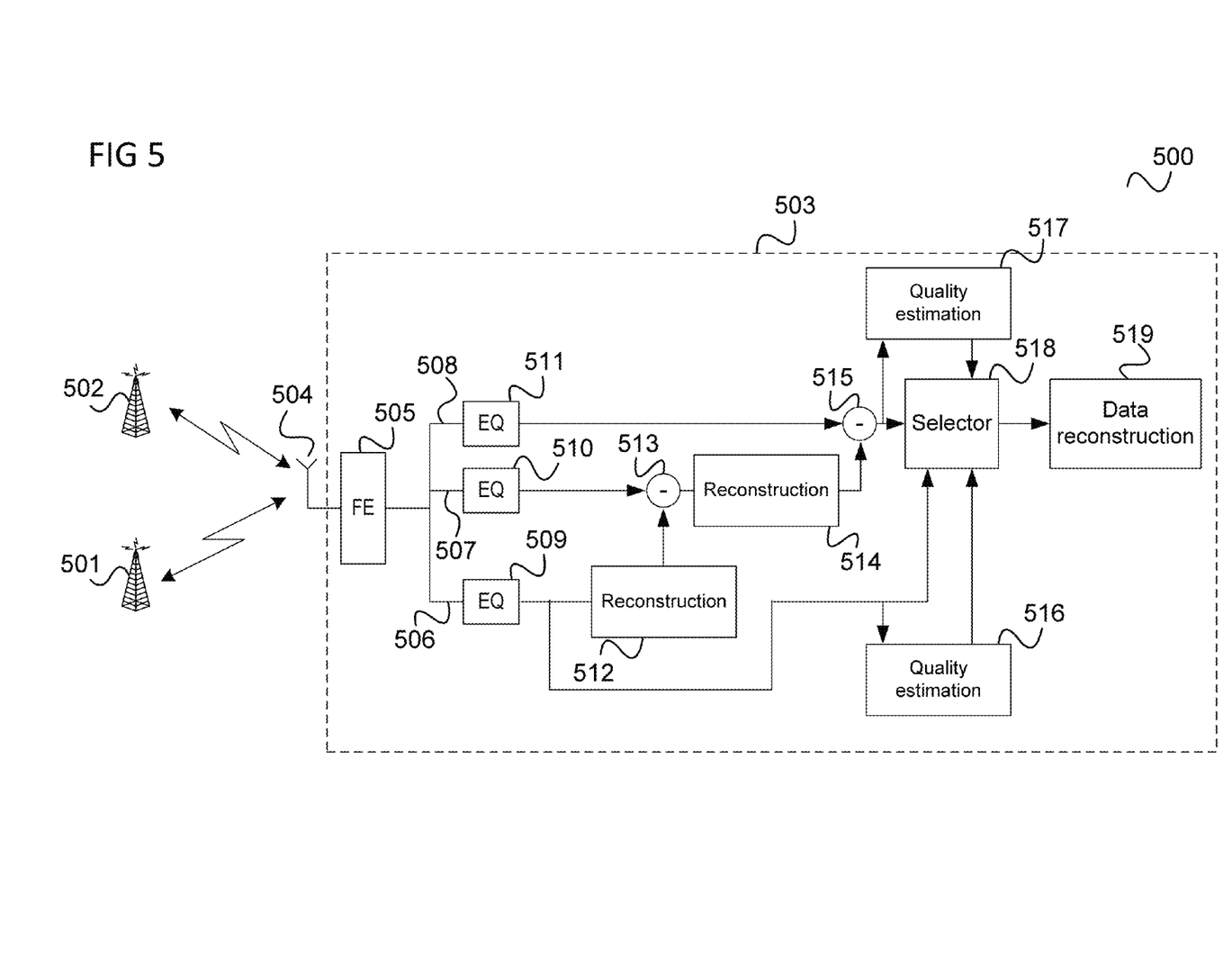
FIG. 5 shows a communication arrangement including a further example for a receiver architecture of a communication device including a selection of an interference cancellation result or an interference suppression result for data reconstruction.

FIG. 5 shows a communication arrangement 500 including a further example for a receiver architecture of a communication device including a selection of an interference cancellation result or an interference suppression result for data reconstruction.

The communication arrangement 500 includes a serving base station 501 and an interfering base station 502. A communication device 503 receives the combination of an information signal from the serving base station 501 and an interfering signal from the interfering base station 502 via its receive antenna 504 and its receiver frontend 505. The receiver frontend 505 supplies the received signal (e.g. converted to baseband) to three paths 506, 507, 508. Each path includes an equalizer 509, 510, 511, e.g. in the form of an FIR (finite input response) filter. For example, the equalizers 509 and 511 could be matched to the communication channel from the serving base station 501 and the receive antenna 504, while the equalizer 510 could be matched to the communication channel from the interfering base station 502 and the receive antenna 504. The equalizer 509 of the first path 506 may for example perform interference suppression corresponding to the interference suppression block 402. The output of the equalizer 509 of the first path 506 is fed to a reconstruction block 512 of the first path. The result of the reconstruction is subtracted from the output of the equalizer 510 of the second path 507 by a subtractor 513 of the second path 507. This can be seen as an estimate of the information signal being canceled from the received signal. The output of the subtractor 513 of the second path 507 is reconstructed by a reconstruction block 514 of the second path 507 whose result is subtracted from the output of the equalizer 511 of the third path 508 by a subtractor 515 of the third path 508. This can be seen as an estimate of the interference signal being canceled from the received signal. The reconstructors 512, 514 may for example include a despreading, symbol demapping and respreading as well as further filtering and signal processing.

The output of the equalizer 509 of the first path 506 is the result of the interference suppression and the output of the subtractor 515 of the third path 508 is the output of the interference cancellation. The quality of both results is determined by a respective signal quality determiner 516, 517 (e.g. determining the respective SINR). The determined qualities are fed to a selecting block 518 which selects one of the results and supplies it to further receiver components 519 for reproducing the information from the received signal (e.g. including a despreader etc.).

In other words, for example the input of the reproduction components 519 (e.g. the input to a demodulator stage) either the output signal of the interference suppression path or the output signal of the interference cancellation path, based on comparing a quality metric derived for each of the paths.

Simulations and lab testing performed on communication devices based on WCDMA radio technology show that dynamically selecting either interference suppression or interference cancellation according to the operating conditions has relatively poor performance in some use cases. For example, in some critical scenarios (typically in fast fading profiles, with complex code and power allocation used by the serving base station and the interfering base station) the data throughput achieved by with IS/IC hard-selection is actually up to 7-8% lower than the throughput achieved by IS alone. The root cause appears to be that the signal quality metric (based on which the selection is done) not always reflects accurately enough the reliability of the soft-bits at the output of the de-spreader. Additionally, to avoid signal buffering, the quality metric measured during one time slot may be used to select the signal path in the following time slot: this may lead to incorrect selection and sub-optimal performance in case of fast changing channel conditions.

Therefore, according to the example described in the following, rather than hard-selecting at each defined time slot the signal (IS result signal or IC result signal) with best estimated quality, the IS and IC result signals are linearly combined using appropriate weighting coefficients. Simulations show that this approach, referred to as IS/IC soft-combining in the following, can yield up to 8-10% higher data throughput in some use cases compared to IS/IC hard-selection, i.e. the approach described with reference to FIGS. 4 and 5.

The replacement of the hard-selection approach with a soft-combining (linear combination) of the two (IS and IC) result signals, using suitably chosen weighting coefficients allows achievement of the following:

1. Incorrect selections of the best path for demodulation may be avoided. In the hard-selection approach, wrong selections may occur due to, e.g., inaccurate estimation of the quality metric and fast changes in channel conditions (in practice, to avoid signal buffering, the quality metric is typically measured in one time slot, but it is applied to make a selection in the following slot)
2. By linearly combining the IS and IC output signals, the wanted signal components add constructively, whereas in general the noise components will not, yielding improved average signal-to-interference-and-noise ratio (SINR) and consequently higher data throughput.

Figure 6:
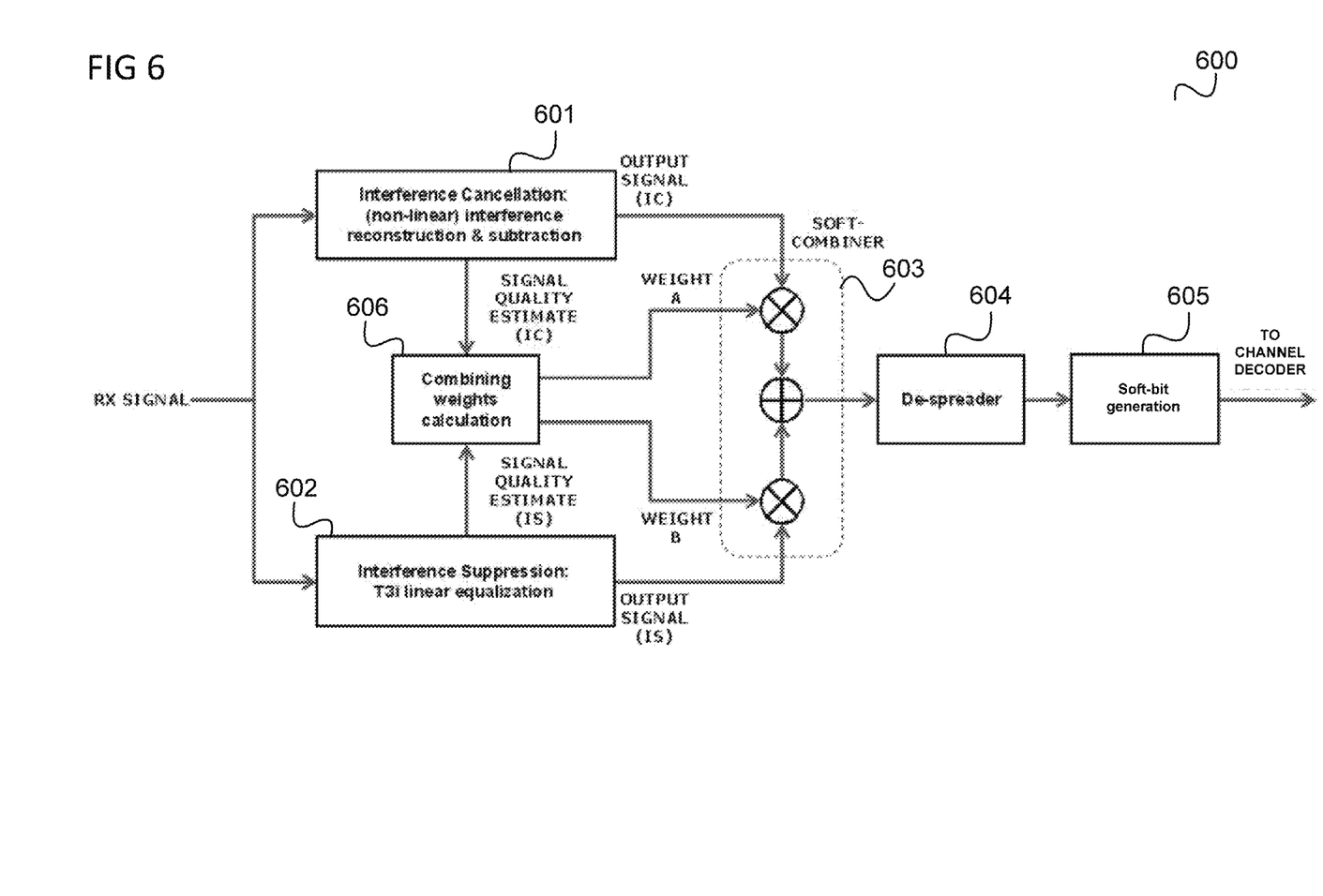
FIG. 6 shows a receiver architecture of a communication device including a weighted combination of an interference cancellation result and an interference suppression result for data reconstruction.

FIG. 6 shows a receiver architecture of a communication device including a weighted combination of an interference cancellation result and an interference suppression result for data reconstruction.

In this example, a received baseband signal (RX signal), e.g. received by a receiver frontend of the communication device, i.e. generated by the received frontend from a received radio frequency (RF) signal, is fed to an interference cancellation block 601 as well as an interference suppression block 602. The received signal processed by interference cancellation and the received signal processed by interference suppression are both fed to a soft-combiner 603 which combines the processed signals according to a weighted sum. The result of the summing is fed to data reproduction components such as a de-spreader 604, a soft-bit generator 605 and a channel decoder (not shown).

The weights are controlled by a combining weights calculation block 606 which receives a quality estimate of the received signal processed by interference cancellation and the received signal processed by interference suppression.

In other words, the signal selector 403 is replaced by a soft-combiner 603 which computes a linear combination of the output signals from the IC and IS paths using suitably chosen (e.g. real-valued) combining weights (referred to as weights A and B in FIG. 6). The resulting combined signal is then fed to the reproduction (e.g. de-modulation) stage.

The approach illustrated in FIG. 6 can be seen to be based on the following: the signals at the output of the IC and IS paths can be modeled as the sum of a wanted signal component and additive noise. The noise component is typically the sum of uncorrelated (colored) noise, residual uncanceled interference and, for the IC path, interference reconstruction error. Because of the different signal processing techniques (e.g. linear vs. non-linear) used in the IC path and the IS path, while the wanted signal components are in-phase (although possibly with different magnitude), it can be expected that the noise components are differently colored and, as such, uncorrelated to some extent. By linearly combining the two signals, the wanted signal component can be expected to add constructively, whereas the noise component (on average) not or at least not completely: the result is increased average SNR of the wanted signal and consequently higher data throughput. The SNR gain strongly depends on the degree of uncorrelation of the noise components. As a matter of fact, correlation coefficients of the noise sequences in the order of 80-85% have been observed in some simulated use cases, which yielded ~0.5 dB average SNR increase after soft-combining. For comparison, if the correlation coefficient is 0% (totally uncorrelated noise sequences), the average SNR is expected to increase by 3 dB.

One way of computing the combining weights is based on the maximum ratio combining (MRC) criterion, which, according to theory, is the optimum combiner for independent AWGN (Average White Gaussian Noise) channels. Denoted with $SNR_{IC}$ and $SNR_{IS}$, the signal-to-noise ratio of the IC signal and the IS output signal, respectively, the MRC weights are:

$$A = \frac{SNR_{IC}}{SNR_{IC} + SNR_{IS}}$$

$$B = \frac{SNR_{IS}}{SNR_{IC} + SNR_{IS}} = 1 - A$$

The signal to noise ratios $SNR_{IC}$ and $SNR_{IS}$ can be approximated by the SNR measured on the pilot signal of the corresponding signal. Optionally, an additional multiplicative factor may be included in the formulas to normalize both IC and IS signals to unity energy.

The combined signal as output by the soft-combiner 603 can be then expressed as:

$$Combiner_{out} = A \cdot IC_{out} + B \cdot IS_{out} = \frac{SNR_{IC}}{SNR_{IC} + SNR_{IS}} \cdot IC_{out} + \frac{SNR_{IS}}{SNR_{IC} + SNR_{IS}} \cdot IS_{out}$$

Link-level simulations in interference-limited scenarios show that the IS/IC soft-combining can achieve an increase of data throughput on average by 2-4% (depending on the fading profile) in the most critical use cases; up to 11% improvement is seen in single test cases as compared to the interference cancellation and interference suppression schemes alone. As can be expected, the gains are more pronounced in test cases where interference cancellation and interference suppression have comparable level of performance, i.e. when $SNR_{IC} \cong SNR_{IS}$.

Besides the absolute data throughput improvements, no use case has been seen where the IS/IC soft-combining approach yields lower performance than the traditional IS approach alone.

Figure 7:
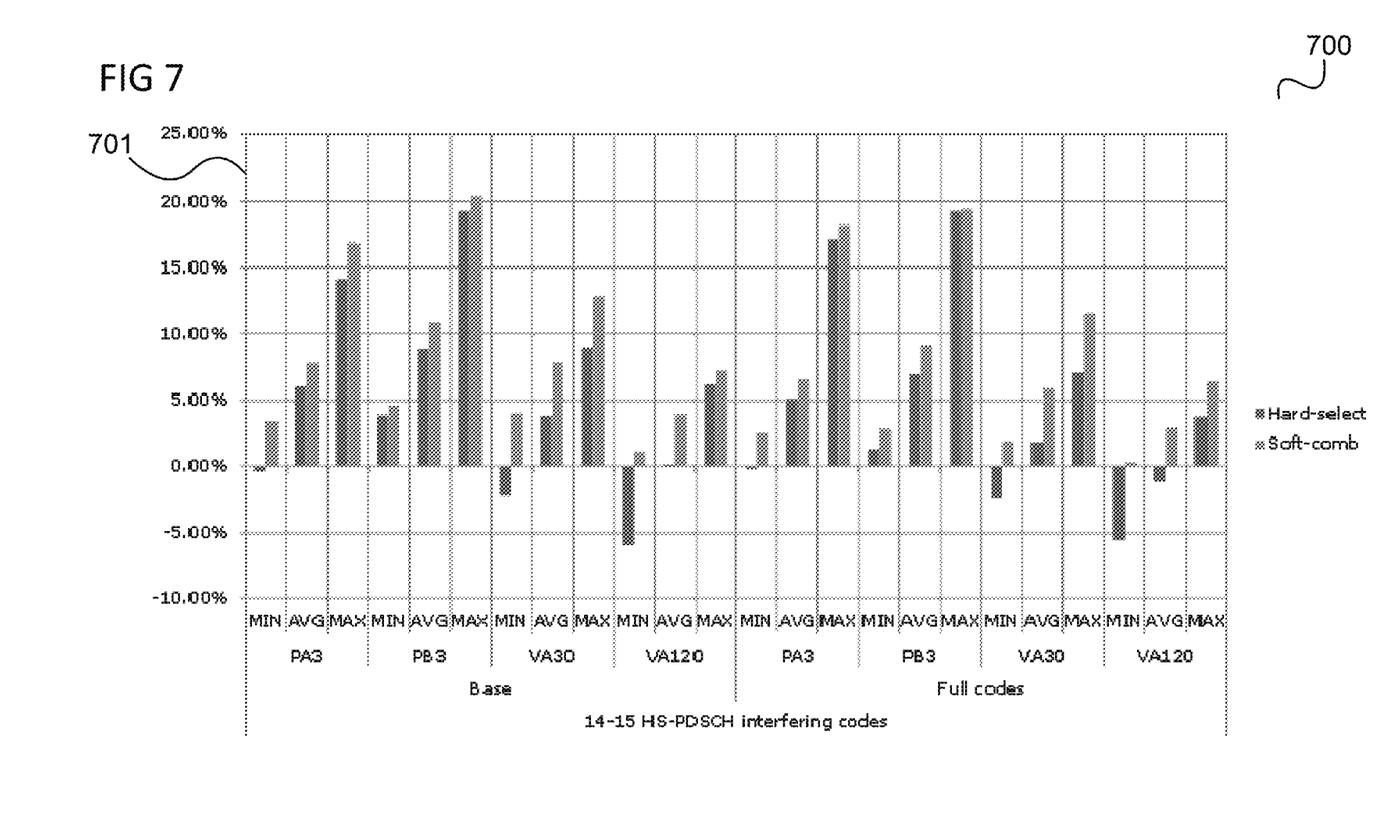
FIG. 7 shows simulation results in various interference-limited scenarios.

FIG. 7 shows simulation results in various interference-limited scenarios: The test cases were defined to represent typical cell-edge scenarios with a single dominant interferer. The test suite included the standard fading profiles PA3, PB3, VA30 and VA120. Each of the 81 tests were defined with serving cell Ior/Ioc ranging from +3 dB down to −3 dB, DIP (Dominant Interferer Proportion) values from −0.5 dB to −4.5 dB and varying number and modulation of the HS-PDSCH codes transmitted by serving and interfering cells. Two code and power allocation scenarios, denoted as "Base" and "Full Codes" scenarios, were defined to verify the robustness of the interference reconstruction approach. The "Base" scenario, besides CPICH (Common Pilot CHannel) and P-CCPCH (Primary Common Control Physical CHannel), included only HSDPA (High-Speed Downlink Packet Access) data and control channels. The "Full Codes" scenario included in addition Rel99 (3GPP Release 1999 of March 2000 (closed June 2011)) channels and is therefore regarded as more realistic. The Y-axis 701 displays the data throughput gain (in %) of the IS/IC hard-selection approach and of the IS/IC soft-combining approach. The gains are referred to the traditional IS approach (Type 3i equalization) alone. As can be seen, in some scenarios with VA30 and VA120 fading profiles, the IS/IC hard-selection approach actually yields a degradation compared to IS alone. These degradations disappear completely with the IS/IC soft-combining approach.

Figure 8:
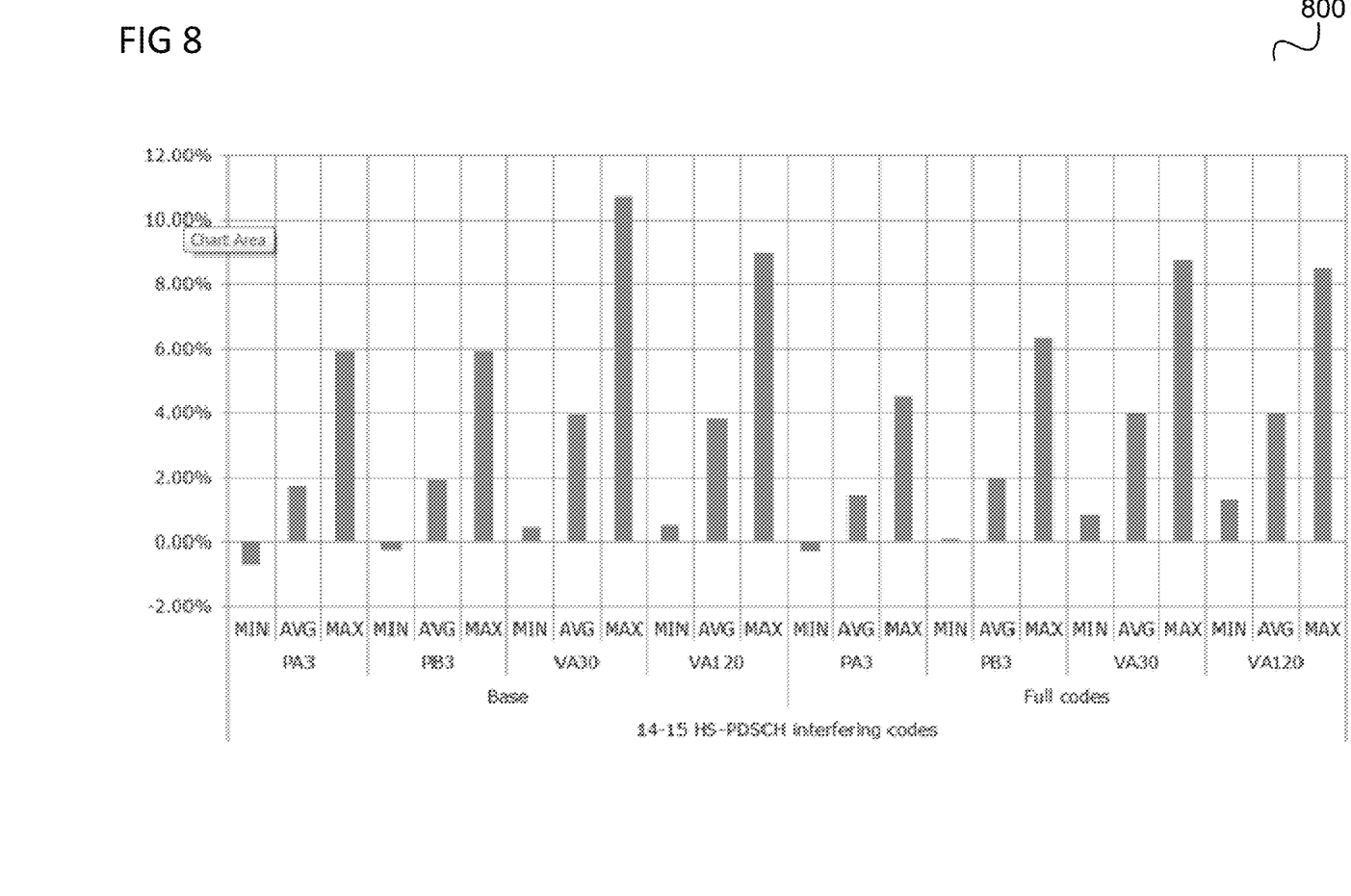
FIG. 8 shows the data throughput gain of IS/IC soft-combining versus IS/IC hard-selection in interference-limited scenarios.

FIG. 8 analogously shows the data throughput gain of IS/IC soft-combining versus IS/IC hard-selection in interference-limited scenarios.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A communication device comprising:
   a receiver frontend component configured to receive a signal, wherein the received signal comprises a combination of an information signal and an interference signal;
   a first interference removal component configured to reconstruct the interference signal and to subtract the reconstructed interference signal from the received signal to generate a first processed received signal;
   a second interference removal component configured to equalize the received signal based on channel information of a communication channel between the communication device and a sender of the information signal and channel information of a communication channel between the communication device and a sender of the interference signal to generate a second processed received signal; and
   a processor configured to reproduce information contained in the information signal based on a comparison of the first processed received signal and the second processed received signal, and further based on the first processed received signal, the second processed received signal or a combination of the first processed received signal and the second processed received signal.

2. The communication device of claim 1, wherein the processor is configured to compare the first processed received signal with the second processed received signal by comparing a signal quality of the first processed received signal with a signal quality of the second processed received signal.

3. The communication device of claim 2, wherein the signal quality is a signal to noise ration or a signal to interference and noise ratio.

4. The communication device of claim 1, further comprising a quality determiner configured to determine the signal quality of the first processed received signal and the signal quality of the second processed received signal.

5. The communication device of claim 1, wherein the combination is a weighted sum of the first processed received signal and the second processed received signal.

6. The communication device of claim 5, wherein the processor is configured to determine the weights for the weighted sum based on a signal quality of the first processed received signal and a signal quality of the second processed received signal.

7. The communication device of claim 5, wherein the processor is configured to weight the processed received signal of the first processed received signal and/or the second processed received signal greater in the weighted sum based on which of the first processed received signal or the second processed received signal has a higher signal quality.

8. The communication device of claim 5, wherein the processor is configured to determine the weight for the first processed received signal based on a relative signal quality of the first processed received signal and to determine the weight for the second processed received signal based on a relative signal quality of the second processed received signal.

9. The communication device of claim 1, wherein the first interference removal component is configured to generate the first processed received signal by non-linear processing of the received signal.

10. The communication device of claim 1, wherein the second interference removal component is configured to generate the second processed received signal by linear processing of the received signal.

11. The communication device of claim 1, wherein the second interference removal component is configured to equalize the received signal to generate the second processed received signal according to a filter based on a minimum mean squared error minimization.

12. The communication device of claim 1, wherein the communication device is a subscriber terminal of a cellular communication network and the sender of the information signal is a base station operating a serving cell of the subscriber terminal and the sender of the interference signal is a base station operating a neighboring cell of the serving cell.

13. A method for processing a received signal comprising:
    receiving a signal at a communication device, wherein the received signal comprises a combination of an information signal and an interference signal;
    reconstructing the interference signal and subtracting the reconstructed interference signal from the received signal to generate a first processed received signal;
    equalizing the received signal based on channel information of a communication channel between the communication device and a sender of the information signal and channel information of a communication channel between the communication device and a sender of the interference signal to generate a second processed received signal;
    comparing the first processed received signal with the second processed received signal; and
    reproducing information contained in the information signal based on the first processed received signal, the second processed received signal or a combination of the first processed received signal and the second processed received signal based on the result of the comparison.

14. The method of claim 13, comprising comparing the first processed received signal with the second processed received signal by comparing a signal quality of the first processed received signal with a signal quality of the second processed received signal.

15. The method of claim 14, wherein the signal quality is a signal to noise ration or a signal to interference and noise ratio.

16. The method of claim 13, further comprising determining the signal quality of the first processed received signal and the signal quality of the second processed received signal.

17. The method of claim 13, wherein the combination is a weighted sum of the first processed received signal and the second processed received signal.

18. The method of claim 17, comprising determining the weights for the weighted sum based on a signal quality of the first processed received signal and a signal quality of the second processed received signal.

19. The method of claim 17, comprising weighting the processed received signal of the first processed received signal and the second processed received signal stronger in the weighted sum having the higher signal quality.

20. A non-transitory computer readable medium having recorded instructions thereon which, when executed by a processor, make the processor perform a method for performing radio communication, the method comprising:

receiving a signal at a communication device, wherein the received signal comprises a combination of an information signal and an interference signal;

reconstructing the interference signal and subtracting the reconstructed interference signal from the received signal to generate a first processed received signal;

equalizing the received signal based on channel information of a communication channel between the communication device and a sender of the information signal and channel information of a communication channel between the communication device and a sender of the interference signal to generate a second processed received signal;

comparing the first processed received signal with the second processed received signal; and reproducing information contained in the information signal based on the first processed received signal, the second processed received signal or a combination of the first processed received signal and the second processed received signal based on the result of the comparison.

* * * * *